June 8, 1965 J. E. LEGER 3,188,259
DIELECTRIC HEAT SEALING APPARATUS
Filed Feb. 16, 1961
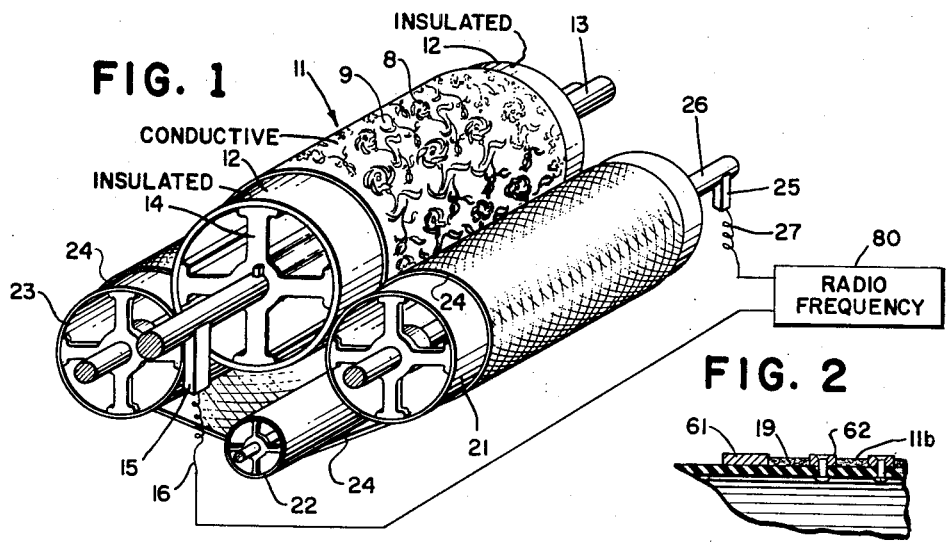
FIG. 1
FIG. 2
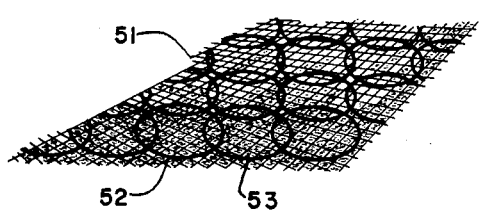
FIG. 4
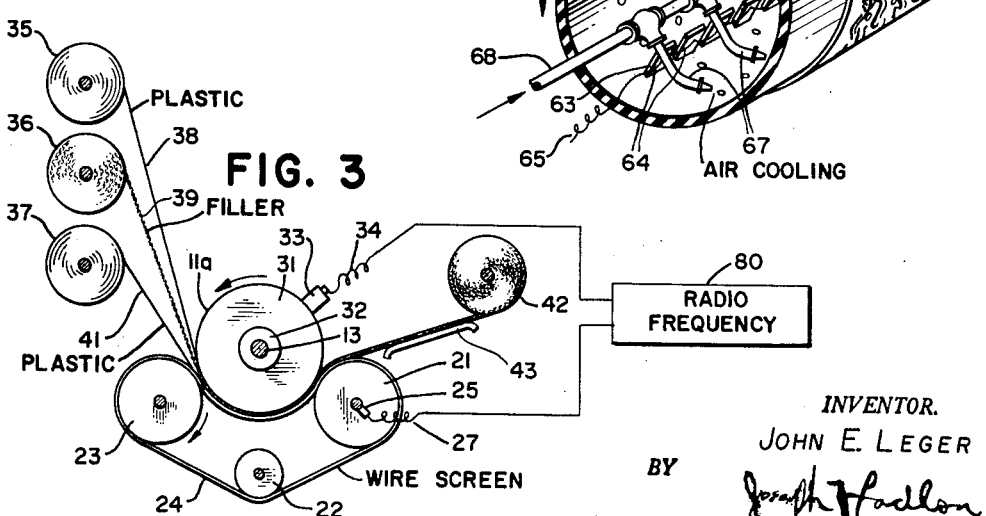
FIG. 5
FIG. 3
INVENTOR.
JOHN E. LEGER
BY
Joseph H. Hadlow
ATTORNEY

United States Patent Office 3,188,259
Patented June 8, 1965

3,188,259
DIELECTRIC HEAT SEALING APPARATUS
John E. Leger, Nashua, N.H., assignor to Accelerated Industries, Inc., Nashua, N.H.
Filed Feb. 16, 1961, Ser. No. 89,865
5 Claims. (Cl. 156—380)

This invention relates to electric welding devices and more particularly to an improved machine for producing fusion welds in sheet plastic materials by means of radio frequency heating.

Welding machines heretofore known for securing together sheets of plastic material over an extended area have consisted essentially of a press having a die which is insulated from the bed of the press, and containing a raised line pattern of metallic pressure points which are lowered into pressure contact with two or more layers of plastic sheet material spread on the bed of the press. Radio frequency excitation of appropriate frequency and intensity is then applied between the die and the bed of the press in order to produce dielectric energy dissipation in that portion of the plastic film or films which lies between the pressure points and the press bed. The heat generated by this energy dissipation locally softens or fuses the plastic, and the pressure of the press causes it to flow together into a weld. One of the principal reasons for using radio frequency heating in welding of plastics, as opposed, for example, to the welding of metals, is the relatively low thermal conductivity which is characteristic of plastic materials, and which renders it impractical to attempt to fuse the plastic together by the application of direct heat, since such heat, in many instances, would not be conducted into the weld area in sufficient quantity to produce a weld within a reasonable length of time, or without thermal damage to surrounding areas. By the same token, a weld after completion by radio frequency heating in the abovedescribed process is in a plastic state and without substantial strength. It is, therefore, necessary to wait a sufficient length of time for the weld to cool down to a temperature at which the weldment will regain at least some substantial portion of its original tensile strength before the work can be removed from the press.

Due to the low thermal conductivity of the plastic as above-mentioned, this cooling of the work in the die is an undesirably lengthy procedure for production operation of the press, since although heating by radio frequency induction may be as fast as desired, there is no known means of extracting heat except by the relatively slow process of conduction. Therefore it is with providing an improved means of producing continuous plastic welds in a broad sheet wherein there is no waiting period while the welder is inoperative, that this invention is concerned.

It is, therefore, an object of this invention to provide means for rapidly welding thermally resistive materials.

It is another object of the invention to provide such means for welding such material in large sheets.

It is a further object of the invention to provide means for so welding such material in a continuous and uninterrupted process.

It is a further object of the invention to provide means for welding sheets of thermoplastic material wherein fusion welding occurs in one region and cooling of the weld advantageously occurs in a separate and remote region.

It is a still further object of this invention to provide means for welding thermoplastic sheet material in a continuous and inherently automatic manner.

These and other objects which will hereinafter become apparent I achieve by causing the plastic welds to be made on the moving periphery of an embossed, conductive roller with which the plastic web is pressed firmly in contact, the weld being made along the zone of the roller with which the plastic web is in contact by causing it to serve as a rotary electrode, while the web remains in pressure engagement with the embossed roller over a substantial portion of its periphery, and before the web is led away from the moving roller.

It is an advantage of this invention that the productive capacity of the equipment can be readily adjusted with precision and ease to the speed of operation desired.

It is a further advantage of the invention that broad sheets may be accommodated, unrestricted by limitations due to depth of a press throat.

It is a further advantage that reciprocating machinery is not employed in the practice of the invention.

These and other advantages of the invention will be more readily apprehended from consideration of the following specific illustrative example of the preferred manner of practicing the invention wherein:

FIG. 1 is a perspective view of a machine constructed in accordance with the principles of the instant invention;

FIG. 2 is a sectional view of an alternative construction of a portion of FIG. 5;

FIG. 3 is a diagrammatic front view of an assembly comprising FIG. 1;

FIG. 4 is a view of an alternative arrangement of a portion of FIG. 1; and

FIG. 5 is a perspective view of an alternative arrangement of a portion of FIG. 1.

Turning now to the drawings, there is shown in FIG. 1 a drum 11 of electrically conductive material having at either end thereof, portions 12 constructed of electrically insulating material, and mounted upon a rotatable shaft 13 by means of spiders 14 for rotation in bearings by motive means not shown. Spider 14 is constructed of conductive material and completes an electrical circuit between drum 11 and shaft 13. Sliding conductive brush 15, retained and resiliently urged against shaft 13 by brush holder means not shown is thereby enabled to energize drum 11 with high frequency energy over the wire 16 connected to a suitable high frequency generator 80, during the rotation of drum 11.

The central surface of drum 11 (exclusive of portions 12) is covered with an appropriate conductive intaglio design of choice, 8. Interstices of the design are conveniently filled with a nonconducting material, such as felt 9 adhered to the exterior surface of drum 11.

The rolls 21, 22, and 23 are of metal, conventionally journalled, unpowered, and adapted to guide and support a web 24 of screen wire cloth, or other flexible conductive material in contact with the drum 11. A brush 25 on the shaft 26 of the roll 21 is adapted to make sliding and continuous electrical connection between the assembly comprising rolls 21, 22, 23 and the screen wire 24, and the ground or return connection of the high frequency generator aforementioned. It is to be understood that in the practical operation of the instant device employing radio frequency heating, more attention is to be given to the wiring, shielding, location, and arrangement of the energizing wires 16 and 27 than has been diagrammatically indicated here. Such design is a matter well understood in the art, and any well known expedient for energizing the drum 11 by brushes as shown, or by capacitive coupling, or otherwise is contemplated only as a design detail of the invention, the purpose being to retain drum 11 at an R.F. potential different from that of screen 24 when they are separated by a nonconductive web.

In FIG. 2 there is shown a cross sectional view of a section of an alternative construction of a drum such as 11b of FIG. 5, wherein however an intaglio pattern having portions in cross section such as 61 are fastened to a cylindrical nonconductive surface 18 by means of rivets such as 62, the interstices of the pattern being filled by the felt 19.

In FIG. 3 is shown a diagrammatic end view of the assembly supporting web 24, namely the rollers 21, 22, and 23, together with a drum 11a which is similar to the drum 11 of FIG. 1 except the cylindrical portion is all metal or electrically conductive material and in having a terminal supporting structure comprising the disc 31 wherein is inserted an insulative bushing 32 carrying the shaft 13, whereby drum 11a is insulated therefrom. The brush 33 is urged into sliding conductive contact with the drum 11a by a resiliently mounted brush holder not shown, and the wire 34 connected thereto used for energization of drum 11a after the manner of wire 16 above described in connection with the drum 11 of FIG. 1.

Rolls 35, 36, and 37, respectively are coils of sheet plastic material, filler material such as cotton sliver, and sheet plastic material, conventionally supported, and unwinding at 38, 39, and 41 to be drawn around drum 11a by frictional contact pressure of the web 24. Said plastic material is of such kind as is fusible under dielectric heating, and is so fused in the areas pressed between the design 8 (FIG. 1) and the web 24 by an application of high frequency energy continuously to the wires 27 and 34 during continuous rotation of the drum 11a. It is apparent that any desired reasonable number of sheets of plastic may be employed and that the roll 36 of sliver may be omitted if desired. Moreover, the invention is not limited to the fusion of thermoplastic plastics, such as polyvinyl chloride, acetate, polystyrene, etc., but may be similarly used for the setting of adhesive surfaces so led into contact, and in vulcanizing together sheets of vulcanizable material in the same manner. Roll 42 is driven at a speed sufficient to take up and store the welded-together layers thereon as fast as discharged from the drum, but without imposing undue tension on the web, in any well known manner.

It is thus seen that no disruptive forces of any kind are applied to the welded-together plastic assembly after welding, which would be of a kind tending to separate or destroy the bond of the weld, and it is thus unnecessary to provide any cooling period for the weld, since it is immediately rolled onto the roll 42, where it remains under restraining compressive forces until natural cooling ultimately occurs.

If it is desired to roll the welded plastic sheet on the roll 42 only after the weld has congealed, the moving sheet may be drawn across a cooling table 43 which supports it during the interval of cooling.

While the drum 11 has been described as provided with an intaglio design 8, it is also possible to employ a plain metal drum in conjunction with a web of the type shown at 51 of FIG. 4 having an intaglio surface design 52 of flexible conductive material thereon and having nonconductive flexible material 53 in the interstices thereof. Because of its superior simplicity and durability, however, the arrangement of FIG. 1 is preferred.

It will be understood that the plastic sheet materials 38 and 41 are of a width adequate to cover simultaneously at least a portion of the insulative portions 12 of drum 11, and that in referring to insulating materials herein, I contemplate only those insulating materials which are efficient at the frequencies involved in dielectric heating, namely those having a suitably low dissipation factor to prevent substantial overheating of the insulative materials or energy loss therein.

In FIG. 5 there is seen a drum 11b of electrically insulating material, supported at a remote end in cantilever fashion for rotation by means for support and rotation not shown. Discontinuous metallic appliques 61 are retained thereon by means of flush metallic rivets 62 in a manner seen more clearly in FIG. 2. Brushes 63 joined by straps 64 are connected through a lead wire 65 to a high frequency generator (not shown) and contact axial rows of rivets successively during drum rotation, because of the resilient radial outward pressure thereon from fixed brush holders (not shown). In this way energization of drum 11b is confined to an element of its cylindrical surface having a fixed spatial position, and is discontinued after the plastic sheets, traveling in the manner of FIG. 3, leave the heating zone, but before it breaks contacts with drum 11b. A cooling influence may thus be applied to another and rotationally successive elemental area of the drum with which the welded plastic is still in contact, for flash cooling of the weld. Such a cooling influence is illustrated by the fixed nozzles 67 manifolded on a pipe 68 for the introduction of a coolant such as compressed air. Obviously, it is also feasible to employ a hollow journal provided with a bearing at the proximate end of drum 11b through which such pipe 68 and wire 65 may be led.

This arrangement of FIG. 5 is contemplated for use in situations where a plastic of extremely low thermal conductivity is to be welded, and for cases where very high speed of operation is a necessity. In all other cases, the simpler arrangement of FIG. 1 is preferred.

This invention has been described in terms of a preferred illustrative embodiment thereof and it is evident that various alternatives and modifications thereof will readily occur to those skilled in the art, which do not however, depart from the essential spirit of the invention, and it is therefore intended that the invention shall be limited only by the appended claims.

What is claimed is:

1. A machine for constructing a continuous plastic sandwich from rolls of plastic material by dielectric bonding in a patterned bond which comprises patterned pressure roller means having a raised conductive surface pattern, electrically insulating material attached to said roller means between raised portions of said pattern, a conductive endless web which is roller mounted for continuously traveling in wrapping pressure engagement with said roller means over a substantial arc of engagement to compress said sheet material into contact with said pattern, said electrically insulating material preventing mechanical distortion of said plastic material during bonding by supporting said plastic material between raised portions of said pattern, means to energize said roller means and said web for dielectrically heating said sheet material, and means including said web for continuously cooling a plastic sandwich while retaining the sheet materials thereof in register during the cooling period.

2. The invention according to claim 1 wherein said means for cooling includes separate means to support a moving plastic sandwich in a cooling environment.

3. The invention according to claim 1 wherein said means for cooling consists of means for providing a flow of coolant.

4. Apparatus for heat treating and fusing plastic materials which respond to dielectric heating, said apparatus comprising a die roller having a raised pattern, the unraised portions of said pattern being substantially filled with an insulating material, said raised pattern being formed of an electrical conductor, an electrically conductive surface adapted to bear against the pattern of said die roller over a substantial portion of its surface, means for continuously supplying to the space between said roller and said surface a plastic material to be treated, said conductive surface moving with said plastic material as it is supplied between said roller and said surface, and means for connecting a source of continuous radio frequency power to said die and said surface, the portion of said roller against which the plastic material to be treated is pressed by said surface being sufficient to ensure a dwell period long enough to ensure adequate time of treatment and to ensure an unchanging load on said source.

5. Apparatus for heat treating and fusing plastic materials which respond to dielectric heating, said apparatus comprising a die drum having a raised pattern on its surface, said raised pattern being formed of electrically conductive material, the unraised portions of said die pattern being substantially filled with an electrically insulating material, an electrically conductive endless flexible surface adapted to bear against a substantial portion of said drum and to accommodate itself to that portion, means for supplying at least one layer of plastic material to be treated to the junction of the drum tand the conductive surface, said plastic material being moved through said junction to the junction of the drum and the conductive surface, means for driving said drum and said surface, and means for connecting a supply of radio frequency energy to said drum pattern and said surface to subject the plastic material therebetween to such energy, the portion of the drum against which said surface bears providing sufficient dwell time for the material to be treated to be properly fused.

References Cited by the Examiner

UNITED STATES PATENTS

| | | | |
|---|---|---|---|
| 2,476,283 | 7/49 | Castellan | 156—282 |
| 2,621,138 | 12/52 | Messing | 154—106 |
| 2,766,362 | 10/56 | Kinder et al. | 219—10.53 |

FOREIGN PATENTS 734,909  8/55  Great Britain.

EARL M. BERGERT, *Primary Examiner.*

C. F. KRAFFT, *Examiner.*